May 11, 1926.　　　　W. MARSHALL　　　　1,584,393
PANEL JOINT
Filed Sept. 29, 1924
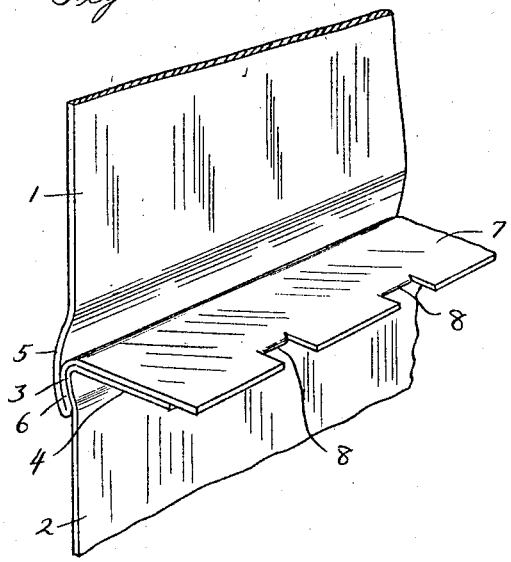
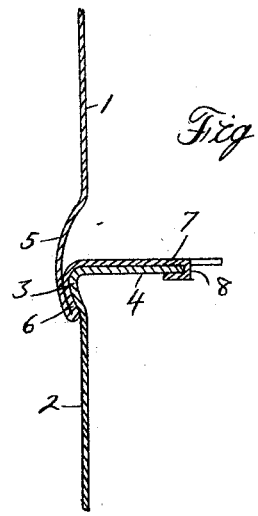
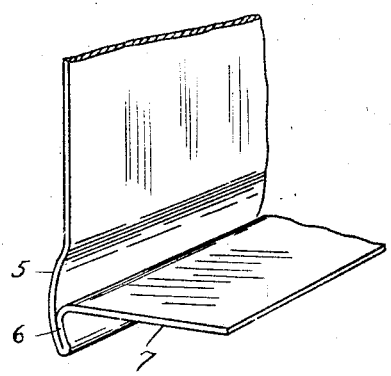
William Marshall, Inventor Patented May 11, 1926.

1,584,393

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

PANEL JOINT.

Application filed September 29, 1924. Serial No. 740,592.

This invention relates generally to sheet metal joints and refers more particularly to the joints between adjacent panels of vehicle bodies.

One of the essential objects of the invention is the provision of a joint of this type that is not visible from the outside of the vehicle body and that can be effected without use of separate securing elements such as nails, screws, bolts, etc. and without the necessity of welding, brazing and soldering the parts together.

With the above and other objects in view the invention consists in certain novel features of construction, combinations and arrangement of parts as will be more fully described and particularly pointed out in the appended claim.

In the accompanying drawing;

Figure 1 is a fragmentary perspective view of a joint embodying my invention;

Figure 2 is a vertical sectional view through the joint;

Figure 3 is a perspective view of the upper panel before the tongues are struck out therefrom.

Referring now to the drawing in which like characters of reference designate corresponding parts throughout the several views, the numerals 1 and 2 respectively designate adjacent sheet metal panels that are preferably secured to a suitable frame (not shown) of a vehicle body or the like. These panels are preferably disposed in the same vertical plane and are adapted to be secured rigidly together along their adjacent edges in such a way that the joint is not visible from the outside of the vehicle body. To accomplish this the lower panel 2 is formed with an outwardly embossed portion 3 that connects into an inwardly extending flange 4, while the upper panel 1 is preferably embossed outwardly to provide a strip of molding 5 for overlapping the embossed portion 3 of the panel 2 and is provided at the free edge of the molding with a close return-bent portion 6 that snugly engages the curved inner face of the molding 5 to the extent of about one half of the width of the molding. This return-bent portion 6 cooperates with the overlapping portion of the molding 5 to form a recessed shoulder for receiving the embossed portion 3 of the panel 2 and connects into an inwardly extending flange 7 which projects slightly beyond the inner edges of the flange 4.

To connect the panels together, the flanges 4 and 7 are placed together so that the embossed portion 3 of the lower panel firmly engages the recessed shoulder 6 of the upper panel so as to interlock therewith whereupon one or more tongues 8 of the desired length are struck out from the flange 7 and are bent over and against the lower face of the flange 4 as shown in Figure 2 of the drawing for holding the embossed portion 3 in engagement with the shoulder 6 whereby the panels will be secured rigidly together.

From the foregoing description, it will be readily apparent that I have provided a strong and durable joint that is not visible from the outside of the vehicle body and that is constructed in such a way that the panels may be connected rigidly together without the use of separate securing elements such as nails, screws, bolts and the like. It will also be apparent that the tongues 8 maintain the embossed portion 3 of the lower panel in firm engagement with the return-bent portion 6 of the upper panel, consequently, the panels are secured rigidly together without the necessity of welding, brazing, or soldering any of the parts together. Furthermore, the over-hanging portion of the molding effectively prevents any water, snow or the like upon the upper panel from passing between the flanges and into the vehicle body.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

A wall structure for vehicle bodies comprising two sheet metal panels, one panel having an outwardly projecting longitudinally extending arcuate-shaped embossed portion and a close return-bent portion at the free edge of the embossed portion, said return-bent portion curving outwardly to approximately the median line of the embossed portion and terminating in an inwardly extending lateral flange, the other panel having an outwardly projecting longitudinally extending embossed portion seating within the outwardly curved return-bent portion of the first mentioned panel and terminating in an inwardly extending lateral flange abutting the lateral flange of the first mentioned panel and terminating short of the inner edge thereof, and tongues struck from the first flange bent around the inner edge of the second flange, binding the two flanges together and holding the embossed portion of the second panel against displacement from the return-bent portion of the first mentioned panel.

In testimony whereof I affix my signature.

WILLIAM MARSHALL.